United States Patent
Hawkins et al.

(10) Patent No.: US 10,450,472 B2
(45) Date of Patent: Oct. 22, 2019

(54) ALKYLENE OXIDE URETHANE ASSOCIATIVE THICKENER MODIFIED WITH A HYDROPHOBIC OLIGOMER

(71) Applicant: Rohm and Haas Company, Collegeville, PA (US)

(72) Inventors: Douglas R. Hawkins, Maple Glen, PA (US); John J. Rabasco, Allentown, PA (US); Antony K. Van Dyk, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 116 days.

(21) Appl. No.: 15/690,636

(22) Filed: Aug. 30, 2017

(65) Prior Publication Data

US 2018/0057698 A1    Mar. 1, 2018

Related U.S. Application Data

(60) Provisional application No. 62/382,462, filed on Sep. 1, 2016.

(51) Int. Cl.
| | | |
|---|---|---|
| *C09D 7/43* | (2018.01) | |
| *C08G 18/48* | (2006.01) | |
| *C08G 18/73* | (2006.01) | |
| *C08G 18/79* | (2006.01) | |
| *C08G 18/10* | (2006.01) | |
| *C08G 18/12* | (2006.01) | |
| *C09D 5/02* | (2006.01) | |

(52) U.S. Cl.
CPC ............... *C09D 7/43* (2018.01); *C08G 18/10* (2013.01); *C08G 18/12* (2013.01); *C08G 18/4825* (2013.01); *C08G 18/73* (2013.01); *C08G 18/792* (2013.01); *C09D 5/024* (2013.01)

(58) Field of Classification Search
None
See application file for complete search history.

(56) References Cited

U.S. PATENT DOCUMENTS

| 6,069,217 A | 5/2000 | Nae et al. |
| 2012/0101223 A1 | 4/2012 | Rabasco et al. |
| 2017/0283626 A1 | 10/2017 | Booth et al. |

FOREIGN PATENT DOCUMENTS

CN    102174163    *    9/2013

OTHER PUBLICATIONS

Machine Translation of Zhang et al, CN 102174163, Sep. 2013, p. 1-5.*

* cited by examiner

*Primary Examiner* — Robert T Butcher
(74) *Attorney, Agent, or Firm* — Reid S. Willis

(57) ABSTRACT

The present invention relates to a composition comprising an aqueous solution or dispersion of an associative thickener having a poly(oxyalkylene-urethane) backbone and at least one terminal hydrophobe comprising from 3 to 20 structural units of an acrylate, a methacrylate, a styrene, or a combination thereof. Brookfield, ICI, and KU viscosity profiles can be tuned with greater ease with the composition of the present invention.

6 Claims, No Drawings

ALKYLENE OXIDE URETHANE ASSOCIATIVE THICKENER MODIFIED WITH A HYDROPHOBIC OLIGOMER

The present invention relates to an alkylene oxide urethane associative thickener modified with a hydrophobic oligomer.

Hydrophobically modified ethylene oxide urethane (HEUR) associative thickeners have been widely used over the past several decades in coatings applications. These nonionic associative thickeners consist of a water-soluble poly(ethylene oxide) backbone (PEO) with various combinations of internal, terminal, and, in some specific cases, pendant hydrophobes. The HEUR is generally prepared by reacting PEO with a stoichiometric excess of a diisocyanate to form a polymer with urethane (carbamate) groups (which behave as weak hydrophobes) and unreacted isocyanate groups. Hydrophobic diols or diamines may also be included to introduce additional pendant and backbone hydrophobic groups. To complete the hydrophobic modification, the intermediate polymer is typically reacted with a straight chain $C_6$-$C_{24}$ alcohol or amine to produce terminal (and possibly pendant) alkyl groups that create hydrophobic interactions.

Despite these innovations and commercial success, HEUR chemistry remains limited by the composition of the hydrophobes to alkyl, alkyl-aryl, or alkyl-amines. While these hydrophobes are usually adequate for thickening, formulators want greater control over thickening of specific latex compositions and shear thinning behavior, and greater time dependent behavior, to create thickeners with superior thickening properties. The hydrophobes currently used to make HEURs are inadequate to control the variation of water/hydrophobe and latex/hydrophobe interactions. Accordingly it would be an advance in the art of HEUR chemistry to discover a class of hydrophobes that provide a means to tune independently the hydrophobicity and the latex interaction.

SUMMARY OF THE INVENTION

The present invention addresses a need in the art by providing a composition comprising an aqueous solution or dispersion of an associative thickener having a poly(oxyalkylene-urethane) backbone and at least one terminal hydrophobe comprising from 3 to 20 structural units of an acrylate, a methacrylate, a styrene, or a combination thereof. The thickener of the present invention allows for facile optimization of Brookfield, KU, and ICI viscosities.

DETAILED DESCRIPTION OF THE INVENTION

The present invention is a composition comprising an aqueous solution or dispersion of an associative thickener having a poly(oxyalkylene-urethane) backbone and at least one terminal hydrophobe comprising from 3 to 20 structural units of an acrylate, a methacrylate, a styrene, or a combination thereof.

As used herein, the term "structural unit" of the recited monomer refers to the remnant of the monomer after oligomerization. For example, a structural unit of methyl methacrylate is represented as follows:

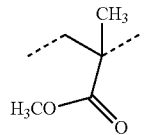

where the dotted lines represent the points of attachment to a polymer backbone.

As used herein, a poly(oxyalkylene-urethane) backbone is a polymer that contains oxyethylene, oxypropylene, or oxybutylene groups connected covalently through urethane groups. Preferably, the poly(oxyalkylene-urethane) is a poly(oxyethylene-urethane).

The at least one terminal hydrophobe is preferably represented by formula I:

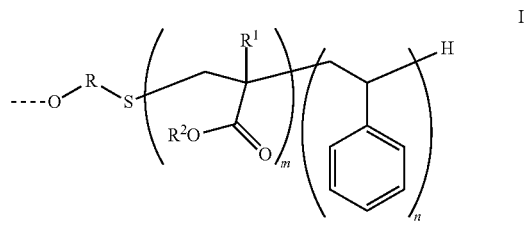

where R is a $C_2$-$C_{20}$ divalent hydrocarbyl group, preferably a $C_2$-$C_{10}$ branched or linear divalent alkylene group; $R^1$ is H or methyl; and $R^2$ is $C_1$-$C_{18}$-alkyl, $C_5$-$C_8$-cycloalkyl, aryl, $C_1$-$C_{18}$-alkylaryl, $C_1$-$C_3$-dialkylamino-$C_1$-$C_{18}$-alkyl, $C_1$-$C_{30}$-alkoxy-$(CH_2CH_2O)_z$—$CH_2CH_2$—, aryloxy-$(CH_2CH_2O)_z CH_2CH_2$— or glycidyl; n is 0 to 20, preferably 3 to 10; m is 0 to 20, preferably 0 to 10; m+n is 3 to 20, preferably 3 to 10, more preferably 3 to 8; and z is from 0 to 50, preferably from 10 to 30.

Examples of preferred R groups include —$CH_2CH_2$—, —$CH_2CH_2CH_2$— groups; examples of suitable $R^2$ groups include methyl, ethyl, n-butyl, 2-ethylhexyl, 2-propylheptyl, dimethylaminoethyl, t-butylaminoethyl, cyclohexyl, isobornyl, and lauryl; other examples of suitable $R^2$ groups include ethoxylated alcohols and dialklyamines, such as $C_{10}H_{21}O(CH_2CH_2O)_zCH_2CH_2$—, $C_{18}H_{35}O$—$(CH_2CH_2O)_z$—$CH_2CH_2$—, $C_{16}H_{33}O(CH_2CH_2O)_zCH_2CH_2$—, $C_{12}H_{25}O(CH_2CH_2O)_zCH_2CH_2$—, $C_{22}H_{45}O$—$(CH_2CH_2O)_z$—$CH_2CH_2$—, tristyryl phenoxy$(CH_2CH_2O)_zCH_2CH_2$—, dibutylamino-$(CH_2CH_2O)_z$—$CH_2CH_2$—, and bis(2-ethylhexyl)amino-$(CH_2CH_2O)_z$—$CH_2CH_2$—.

Preferably, the backbone is terminated with two hydrophobes, more preferably two hydrophobes of structure I. The backbone may also include pendant hydrophobes arising from the presence of structural units of a polyisocyanate branching agent, or hydrophobes incorporated into the backbone arising from hydrophobic diols or diamines; branching agents such as glycerol can also be used to introduce branch points into the polymer backbone.

The hydrophobe of structure I arises from the corresponding alcohol or amine represented by formula II:

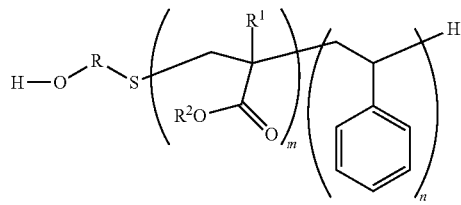

where R, $R^1$, $R^2$, m, and n are previously defined.

The oligomer can be prepared by free radical oligomerization of an acrylate, methacrylate, or styrene monomer or a combination thereof in the presence of a hydroxyalkyl mercaptan chain transfer reagent. The degree of oligomerization can be controlled by adjusting the ratio of monomer to the chain transfer agent.

The associative thickener, which is a hydrophobically modified alkylene oxide urethane associative thickener, preferably a hydrophobically modified ethylene oxide urethane (HEUR) associative thickener, is conveniently prepared by contacting together under reactive conditions an alcohol or an amine functionalized acrylate, methacrylate, or styrene oligomer with 3 to 20 monomer units, preferably the alcohol or amine of formula II; b) a polyisocyanate; and c) a water-soluble polyalkylene glycol.

The polyisocyanate starting material is a $C_4$-$C_{20}$ aliphatic or aromatic diisocyanate or a tri- or tetraisocyanate branching agent. As used herein, "aliphatic diisocyanate" refers to saturated or partially unsaturated linear-, branched-, or cycloaliphatic diisocyanates, or combinations thereof. Examples of suitable diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate. Suitable triisocyanates include isocyanurate trimers and biuret trimers characterized by the following formulas:

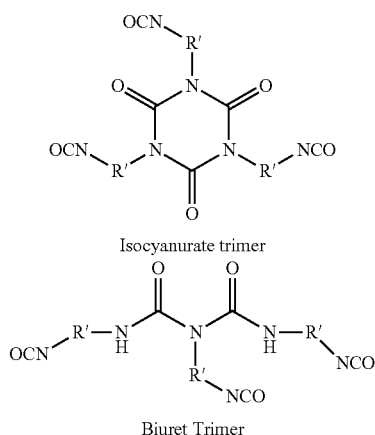

where R' is a $C_4$-$C_{20}$ alkylene group. As used herein, "alkylene group" refers to a biradical saturated or partially saturated hydrocarbyl group that is linear, branched, or cycloaliphatic, or a combination thereof.

Examples of suitable isocyanurate trimers include hexamethylene diisocyanate (HDI) trimer, commercially available as Desmodur N 3600 aliphatic polyisocyanate and isophorone diisocyanate (IPDI) trimer, commercially available as Demodur X 4470 aliphatic polyisocyanate.

A water-soluble polyalkylene glycol refers to water-soluble polyethylene oxides, water-soluble polyethylene oxide/polypropylene oxide copolymers, and water-soluble polyethylene oxide/polybutylene oxide copolymers.

Preferred water-soluble polyalkylene oxides are polyethylene glycols, particularly polyethylene glycols having a weight average molecular weight ($M_w$) in the range of from 4000, more preferably from 6000, and most preferably from 7000 to 20,000, more preferably to 12,000 and most preferably to 9000 Daltons. An example of a suitable polyethylene glycol is PEG 8000, which is commercially available as CARBOWAX™ 8000 Polyethylene Glycol, which is a trademark of The Dow Chemical Company or its affiliates.

The composition of the present invention is useful in coating formulations, especially paint formulations, which may include any or all of the following materials: Solvents; fillers; inorganic pigments, such as titanium dioxide, mica, calcium carbonate, silica, zinc oxide, aluminum trihydrate, talc, antimony trioxide, fly ash, and clay; organic hollow sphere pigments; dispersants; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

The hydrophobes of the associative thickener of the present invention provide formulators with more control over thickening of specific latex compositions and shear thinning behavior, as well as greater time-dependent behavior. More particularly, the oligomeric hydrophobically modified associative thickeners of the present invention overcome the limitations of current thickeners by providing a means to tune independently the hydrophobicity and the latex interaction. The monomer composition, and selection of monomers, is easily varied to adjust the solubility of the hydrophobe in a latex particle, while maintaining hydrophobicity in water or the formulation serum phase.

EXAMPLES

Intermediate Example 1

Preparation of a Hydroxylated Butyl Methacrylate Oligomer

Toluene (200 g) was charged to a 1-L, 4-neck round bottom flask equipped with a water condenser, electric agitator, electronic thermocouple, and an $N_2$ sweep. The contents of the reaction flask were heated to 85° C., whereupon a portion of a monomer mixture (23.8 g) of butyl methacrylate (BMA, 284 g), 2-hydroxyethyl mercaptan (31.2 g), and toluene (160.5 g) was added to the flask, followed immediately by the addition of an initiator solution of a mixture of 2,2'-azoisobutyronitrile (AIBN, 1.42 g) with toluene (30 g). The mixture was stirred by 15 min, after which time a co-feed initiator solution of AIBN (2.84 g) and toluene (50 g) was added at a feed rate of 0.29 g/min. One minute after starting the co-feed initiator solution feed, the remainder of the monomer mixture was fed into the reactor at a feed rate of 4.0 g/min. After both feeds were completed, the reaction mixture was stirred for 16 hours at 85° C.

After cooling the reaction mixture to room temperature, toluene was removed in vacuo. The residue was dissolved in diethyl ether (~600 g) and placed in a separatory funnel. The diethyl ether solution was washed twice with 5% aqueous sodium carbonate (500 g) and diethyl ether was removed in vacuo. The hydroxy terminated BMA oligomer with a degree of polymerization (dp) of 5 was isolated as a viscous, flowable product.

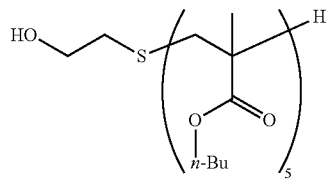

Hydroxylated BMA Oligomer, dp = 5

Intermediate Example 2

Preparation of a Hydroxylated Methyl Methacrylate Oligomer

The procedure for Example 1 was substantially followed with the following modifications: A portion of a monomer mixture (28.1 g) of methyl methacrylate (MMA, 200 g), 2-hydroxyethyl mercaptan (31.2 g), and toluene (50 g) was initially added to the kettle followed by the addition of the initiator solution (AIBN, 1.42 g) with toluene (50 g). A co-feed initiator solution containing AIBN (3.10 g) and toluene (55 g) was then added followed by the remainder of the monomer mixture. The resultant hydroxylated MMA oligomer with a dp=5 was isolated as a viscous flowable product.

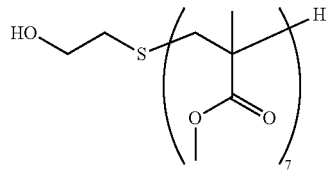

Hydroxylated MMA Oligomer, dp = 5

Example 1

Preparation of HEUR Functionalized with Hydroxylated BMA Oligomer

A mixture of CARBOWAX™ 8000 Polyethylene Glycol (150 g) and toluene (340 g) were added to a vessel and dried by azeotropic distillation. The mixture was cooled to 90° C., at which temperature Desmodur H aliphatic diisocyanate (4.51 g) was added with stirring to the vessel. After the contests of the vessel were stirred for 5 min, dibutyltin dilaurate (0.21 g) was added to the vessel. Stirring continued for 1 h, after which time the mixture was cooled to 80° C. BMA Oligomer from Example 1 (15.40 g) was then added to the vessel and stirring was continued for an additional 1 h. The mixture was cooled to 60° C., butylated hydroxytoluene (BHT) added (0.05 g), and solvent was removed in vacuo to isolate the polymer.

Example 2

Preparation of HEUR Functionalized with Hydroxylated MMA Oligomer

A mixture of CARBOWAX™ 8000 Polyethylene Glycol (150 g) and toluene (360 grams) were added to a vessel and dried by azeotropic distillation. The mixture was cooled to 90° C., at which temperature Desmodur N3600 HDI trimer (0.74 grams) was added to the vessel. After the contests of the vessel were stirred for 5 min, dibutyltin dilaurate (0.21 g) was added to the vessel.

Stirring continued for 1 h, after which time Desmodur H aliphatic diisocyanate (3.76 grams) was added. Stirring continued for 1 h, after which time the mixture was cooled to 80° C. MMA Oligomer from Example 2 (8.33 g) was then added to the vessel and stirring was continued for an additional 1 h. The mixture was cooled to 60° C., BHT (0.05 g) was added, and solvent was removed in vacuo to isolate the polymer.

The associated thickeners of the present invention were evaluated in the formulation illustrated in Table 1. The master batch excludes the final water and the rheology modifier addition amounts.

TABLE 1

| Paint Formulation | |
|---|---|
| | Wt (g) |
| Grind | |
| Water | 30.00 |
| Kronos 4311 | 263.38 |
| RHOPLEX ™ SG-30 Acrylic Emulsion | 421.82 |
| ROPAQUE ™ Ultra Opaque Polymer | 49.78 |
| Ethylene Glycol | 24.30 |
| Texanol Coalescent | 19.19 |
| Triton X-405 | 2.50 |
| Grind Sub-total | 810.98 |
| Letdown | 810.98 |
| Rheology Modifier | a |
| Water[b] | 200.17 |
| MP-95 Dispersant | |
| Drewplus L-475 Foam Control Agent | 4.07 |
| Total | 1015.22 |

RHOPLEX and ROPAQUE are Trademarks of The Dow Chemical Company or Its Affiliates
[a]See Table 2
[b]Water and Rheology Modifier are added to the Master Batch Paint formulations containing the associative thickener of Example 1 (Paints 1A, 1B, and 1C) were prepared with targeted KU and ICI viscosities. Brookfield viscosities and Sag resistances were measured against comparative paint formulations C1A, C1B, and C1C, containing the KU builder ACRYSOL™ RM825 Rheology Modifier (A Trademark of The Dow Chemical Company or Its Affiliates) with the same KU and ICI viscosities. The results of this comparative study are shown in Table 2. 2020E refers to the ICI builder, ACRYSOL™ RM2020 Rheology Modifier; Bf4/0.6 means Brookfield Instrument, spindle #4 at 0.6 rpm.

TABLE 2

Brookfield Viscosity and Sag Resistance Comparative Studies

| Paint | KU | ICI | Ex. 1 (g) | C1 (g) | 2020E (g) | 100 * ICI/KU | Bf4/0.6 | SAG |
|---|---|---|---|---|---|---|---|---|
| 1A | 120 | 1.2 | 2.94 | — | 7.28 | 1.0 | 104000 | 24 |
| 1B | 100 | 1.8 | 1.62 | — | 14.35 | 1.8 | 18000 | 18 |
| 1C | 120 | 1.8 | 3.20 | — | 10.89 | 1.5 | 56000 | 24 |
| C1A | 120 | 1.2 | — | 2.10 | 7.29 | 1.0 | 12000 | 14 |
| C1B | 100 | 1.8 | — | 0.84 | 14.60 | 1.8 | 7000 | 14 |
| C1C | 120 | 1.8 | — | 2.92 | 13.38 | 1.5 | 8000 | 16 |

The paint formulations with the Example 1 thickener shows dramatically improved Brookfield viscosity and Sag resistance over a range of ICI and KU viscosities.

It has also been discovered that KU, ICI, and $B_f$ viscosities can be tuned with the HEURS of the present invention. In the following Table 3, Paints 1D and 1E were prepared using the Example 1 HEUR; paints 2A and 2B were prepared from the Example 2 HEUR; and comparative paints C2A and C2B were prepared using the commercial low shear thickener, ACRYSOL RM-12 Rheology Modifier. The weight in grams of the HEUR refers to the dry weight.

TABLE 3

ICI, KU, and Brookfield Viscosity Comparison

| Paint | HEUR (g) | KU | ICI | $B_f$ |
|---|---|---|---|---|
| 1D | 2.83 | 112 | 0.3 | 31100 |
| 1E | 3.52 | 111.4 | 0.3 | 40100 |
| 1F | 7 | 130 | 0.7 | 67900 |
| 2A | 7.5 | 94.8 | 0.7 | 7300 |
| 2B | 10 | 104.2 | 1.0 | 12000 |
| C2A | 3.56 | 84.5 | 0.2 | 32200 |
| C2B | 5.34 | 105 | 0.1 | 13500 |

Table 3 illustrates that KU, ICI, and Brookfield viscosities improve across the board with increasing amounts of the HEUR in the formulation. In contrast, the paint formulations with the commercial rheology modifier shows an improved KU but a poorer KU and ICI profile.

The invention claimed is:

1. A composition comprising an aqueous solution of an associative thickener having a poly(oxyalkylene-urethane) backbone and at least one terminal hydrophobe represented by the following formula:

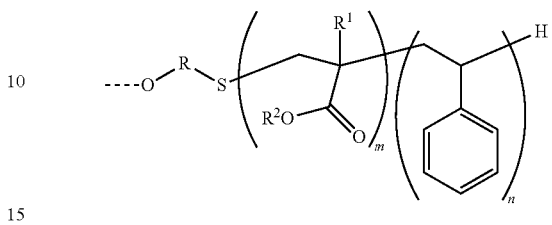

where R is a $C_2$-$C_{20}$ divalent hydrocarbyl group; $R^1$ is H or methyl; and $R^2$ is $C_1$-$C_{18}$-alkyl, $C_5$-$C_8$-cycloalkyl, aryl, $C_1$-$C_{18}$-alkylaryl, $C_1$-$C_3$-dialkylamino-$C_1$-$C_{18}$-alkyl, $C_1$-$C_{30}$-alkoxy-$(CH_2CH_2O)_z$—$CH_2CH_2$—, aryloxy-$(CH_2CH_2O)_z CH_2CH_2$—, or glycidyl; n is 0 to 20; m is 0 to 20; and m+n is 3 to 20; and z is from 0 to 50.

2. The composition of claim 1 where R is a linear or branched $C_2$-$C_{10}$ alkylene group; $R^2$ is methyl, ethyl, n-butyl, 2-ethylheptyl, dimethylaminoethyl, t-butylaminoethyl, cyclohexyl, isobornyl, lauryl, $C_{10}H_{21}O(CH_2CH_2O)_z CH_2CH_2$—, $C_{18}H_{35}O$—$(CH_2CH_2O)_z$—$CH_2CH_2$—, $C_{16}H_{33}O(CH_2CH_2O)_z CH_2CH_2$—, $C_{12}H_{25}O(CH_2CH_2O)_z CH_2CH_2$—, $C_{22}H_{45}O$—$(CH_2CH_2O)_z$—$CH_2CH_2$—, tristyryl phenoxy$(CH_2CH_2O)_z CH_2CH_2$—, dibutylamino-$(CH_2CH_2O)_z$—$CH_2CH_2$—, and bis(2-ethylhexyl)amino-$(CH_2CH_2O)_z$—$CH_2CH_2$—; where z=0-50; m is 0 to 10; n is 3 to 10; and m+n is 3 to 10.

3. The composition of claim 1 where R is —$CH_2CH_2$—; $R^1$ is H or $CH_3$; $R^2$ is methyl, ethyl, n-butyl, or 2-ethylheptyl; m is from 3 to 10; and n is 0.

4. The composition of claim 1 wherein the associative thickener has a poly(oxyethylene-urethane) backbone and two terminal hydrophobes.

5. The composition of claim 4 wherein the poly(oxyethylene-urethane) backbone comprises pendant as well as terminal hydrophobes.

6. The composition of claim 3 where R is —$CH_2CH_2$—; $R^1$ is H or $CH_3$ and $R^2$ is methyl or butyl, with the proviso that when $R^1$ is methyl, $R^2$ is methyl, and when $R^1$ is H, $R^2$ is butyl; and m+n is from 3 to 8.

* * * * *